No. 759,342. PATENTED MAY 10, 1904.
F. H. BRUNIG.
PESSARY.
APPLICATION FILED SEPT. 24, 1903.
NO MODEL.

Witnesses
Frank Glore.
Fred V. Griffith

Inventor
F. H. Brunig.
By George J. Thorpe
Atty.

No. 759,342. Patented May 10, 1904.

UNITED STATES PATENT OFFICE.

FREDERICK H. BRUNIG, OF KANSAS CITY, MISSOURI.

PESSARY.

SPECIFICATION forming part of Letters Patent No. 759,342, dated May 10, 1904.

Application filed September 24, 1903. Serial No. 174,385. (No model.)

*To all whom it may concern:*

Be it known that I, FREDERICK H. BRUNIG, a citizen of the United States, residing at Kansas City, in the county of Jackson and State of Missouri, have invented certain new and useful Improvements in Pessaries, of which the following is a specification.

My invention relates to pessaries; and my object is to produce a device of this character which without dilating the vagina, and therefore interfering with its function as an aid in supporting the uterus, keeps the uterine canal sufficiently straight in cases of flexions to make menstruation painless and do away with the usual operation of dilating.

A further object is to produce a pessary which keeps the internal mouth of the uterus—its most constricted portion—slightly open to permit of the proper drainage of pus discharge, which reliably maintains its position for an indefinite period without causing any disturbance in the tissues or inconvenience to the patient, which is of extremely light, flexible, and delicate construction, yet durable, because it is subjected to no appreciable friction and but light pressure.

A further object is produce a pessary of the type outlined which is impervious to moisture and air, and can therefore be easily sterilized.

To these ends the invention consists in certain novel and peculiar features of construction and arrangement, as hereinafter described and claimed, and in order that it may be fully understood reference is to be had to the accompanying drawings, in which—

Figure 1:
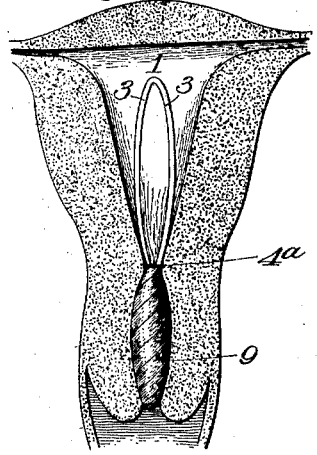
Figure 2:
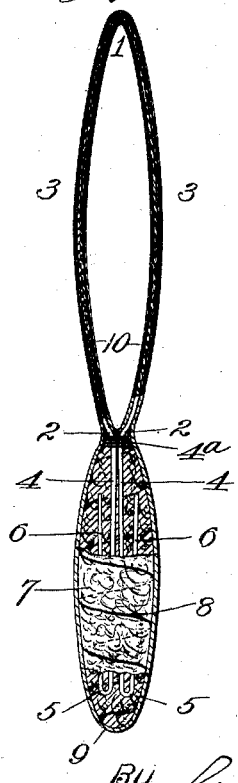

Figure 1 represents a view of the pessary, about full size, as applied in operative position. Fig. 2 is a central longitudinal section on a magnified scale.

In carrying out my invention I take a piece of piano-wire, by preference, of suitable length and bend it, as at 1, about midway its length to form two arms, which arms in turn are bent outwardly, as at 2, so that their rear portions 3 and their front portions 4 shall extend at an angle to each other, and at said junction-point the parts are preferably connected by a ligature $4^a$, which serves to secure the front portions or arms approximately parallel and to spread the loop formed by the rear portions. The front portions or arms 4 are in turn bent back upon themselves, as at 5, so as to produce the substantially parallel terminals 6, having a tendency to spring apart slightly from arms 4. I then take dry absorbent cotton 7 and weave or wrap it around the arms 4 and terminals 6, so as to completely cover the same, this wrapping being of substantially cigar form and secured reliably in position by a silk ligature or string 8, tied around it. This cigar-shaped pad is in turn completely incased by a thin flexible rubber or equivalent substance 9, the preferred form of wrapping being to wind a strip of such substance spirally around the pad, as shown in Fig. 1. The wrapper may also be wound around and completely incase the rear portions 3, forming the loop, as shown at 10 in Fig. 2 only. The wrapper is of rubber or equivalent substance which is impervious to moisture, and to avoid rough edges it is preferably treated to a coating of chloroform or its equivalent, this coating running the rubber together, to give it a smooth surface to permit of easy and painless insertion by avoiding undue abrasion.

For special uses the physician may render the device antiseptic or astringent by inclosing it in an absorbent material and dipping it in the proper solution, which treatment is obvious and well known to the physician and forms no part of the invention, except as it involves the use of this particular pessary or its equivalent as a vehicle for introducing and holding the absorbent material in the uterus. Furthermore, the rendition of the pessary impervious to moisture permits it to be easily sterilized by being submerged in a bichlorid or other antiseptic solution.

The pessary is introduced into the uterus by grasping the loop portions in a dressing-forceps near its front end and pressing the sides of the loop together in order that it may be easily pushed into the neck of the uterus. The loop then remains compressed, and it is only necessary to push it into place with the finger. If this cannot be done readily, a new grip with the forceps is taken to further introduce it, and finally the finger, by preference, is used to eventually dispose it in substantially the position shown in Fig. 1, and in this connection it should be stated that the pessary can be introduced with or without the use of a vaginal speculum. When in its proper position, as shown in Fig. 1, the pessary at its point of smallest cross-sectional area—namely, at the junction of the loop with the pad—occupies the internal mouth of the uterus, which is its most constricted portion, and as a result the resistance afforded to longitudinal movement of the pessary in either direction holds it reliably in position and at the same time keeps the uterine channel sufficiently straight and open to make menstruation painless and to act as a drain in cases where there is a pus discharge, as will be readily understood. By covering the spring for its full length with the wrapper there is no possibility of corrosion nor does such thin flexible wrapper interfere with the proper action of the spring.

From the above description it will be apparent that I have produced a pessary embodying the features of advantage enumerated as desirable in the statement of invention, and while I have illustrated and described its preferred embodiment it is to be understood that it is susceptible of modification in minor particulars without departing from the principle of construction involved.

Having thus described the invention, what I claim as new, and desire to secure by Letters Patent, is—

1. A pessary, comprising a comparatively long and narrow loop, formed of resilient material and tapering gradually toward its ends, and an elongated pad of soft material, of substantially circular form in cross-section, and of greatest diameter near its center, and tapering continuously from said point toward its ends, said pad being carried by and at the rear end of said loop and disposed in longitudinal alinement with the latter.

2. A pessary, comprising a comparatively long and narrow loop formed of resilient material and provided at its rear end with an elongated pad of soft material and of substantially circular form in cross-section; said pad being provided with a covering impervious to moisture.

3. A pessary, consisting of a piece of resilient material bent to form a comparatively long loop and arms projecting from the rear end of the same, an elongated pad of soft material and enveloping and mounted on said arms, and a thin flexible covering for said pad and said loop, which is impervious to moisture.

In testimony whereof I affix my signature in the presence of two witnesses.

FREDERICK H. BRUNIG.

Witnesses:
 FRANK GLORE,
 G. Y. THORPE.